United States Patent [19]

Springer

[11] 3,726,397
[45] Apr. 10, 1973

[54] JOINT FASTENER PACKAGE

[75] Inventor: Hans-Werner Springer, Schmalenbek, Germany

[73] Assignee: Joh. Friedrich Behrens, Ahrensburg, Germany

[22] Filed: Oct. 29, 1971

[21] Appl. No.: 193,682

[30] Foreign Application Priority Data

Jan. 20, 1971 Germany..................P 21 02 501.4

[52] U.S. Cl.................................206/56 DF, 85/11
[51] Int. Cl..........................B65d 69/00, F16b 15/00
[58] Field of Search.....................206/56 DF, 56 AB

[56] References Cited

UNITED STATES PATENTS

| 2,942,267 | 6/1960 | Cusumano | 206/56 DF |
|---|---|---|---|
| 3,032,767 | 5/1962 | Weiss et al. | 206/56 DF |

Primary Examiner—Leonard Summer
Attorney—Townsend F. Beaman et al.

[57] ABSTRACT

A regular row of corrugated joint fasteners in which the corrugated fasteners consist of two types of equal length, one type having a plurality of prominences formed by the corrugation and the other type having at least one less prominence than the said one type, and in which the two types of fastener are located alternately in the said regular row and are so arranged that only the prominences at and/or adjacent to the center of the fasteners are in contact with each other. The contacting prominences of adjacent fasteners are stuck together.

5 Claims, 7 Drawing Figures

3,726,397

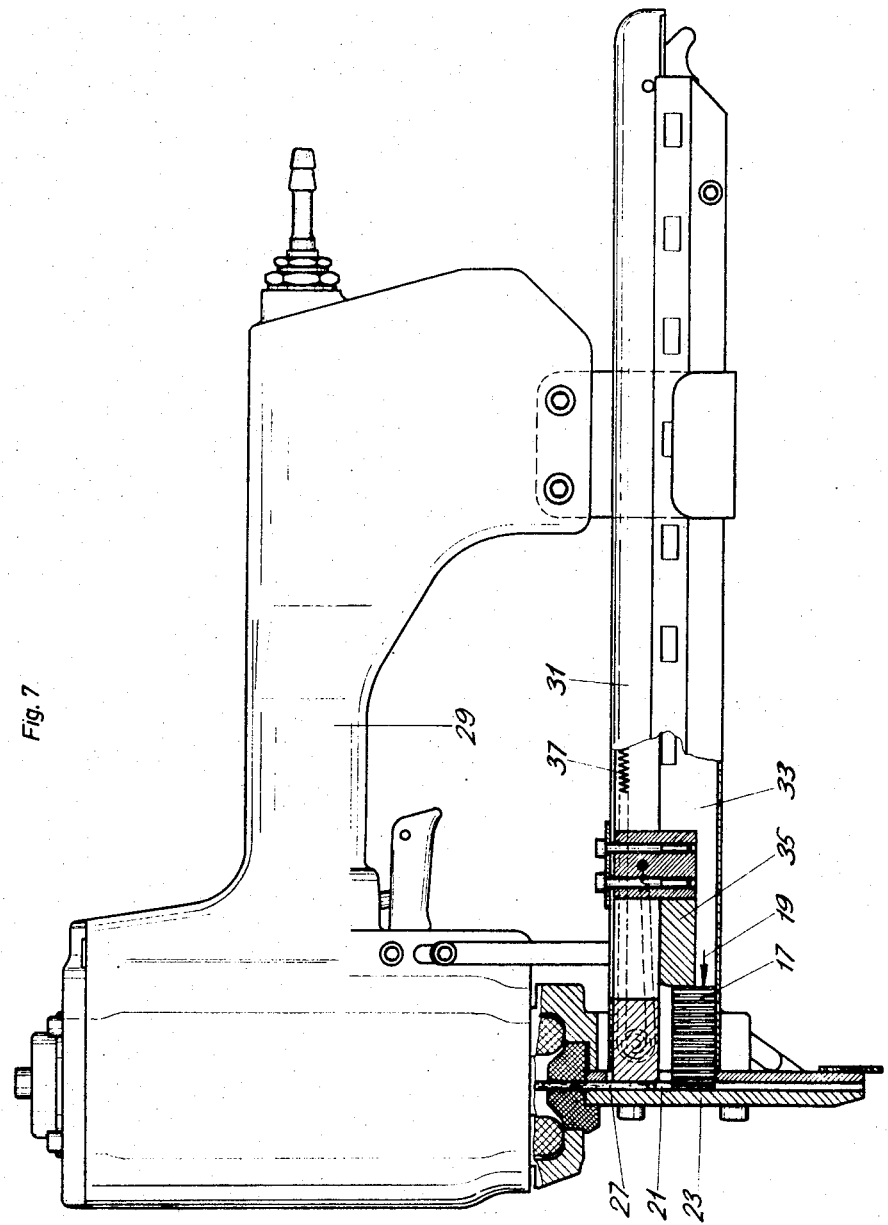

JOINT FASTENER PACKAGE

BACKGROUND OF THE INVENTION

This invention relates to a regular row of corrugated joint fasteners for fastener-driving tools actuated by a fluid medium and provided with loaded magazines for an automatic supply of fasteners, the row consisting of corrugated fasteners arranged in succession with the prominence of one corrugation laid against the prominence of a second, the fasteners being stuck to each other by means of facing prominences.

Corrugated fastening units are already known and exist to be driven, approximately one half on either side, into adjacently positioned workpieces, for instance made of wood, in order thus to connect the workpieces to each other. For the sake of a rational course to the fabricating process, it is necessary for the corrugated joint fasteners to be retained for ready use in magazines so as to be able to arrive in succession automatically at a position for driving home. For the driving process, use is made of fastener-driving tools, such as for example compressed-air fastener-driving devices on which the magazine loaded with corrugated fasteners is located.

In such arrangements great attention has to be given to the positioning in successive ranks of the corrugated joint fasteners, since the safe performance of the operation depends very substantially on the order of the fasteners vis-a-vis each other. If the individual fasteners are situated closely together, as is known in the case of staples, one corrugation fitting into another, then it is difficult for the rammer of the driving tool on each occasion to separate the foremost corrugated fastener from the regular row of fasteners. In this situation it is a particular drawback that the surfaces connected to each other are very large, and therefore really secure adhesion between the individual fasteners, located one behind the other, is unavoidable.

It is a known technique to meet this drawback by arranging, when the corrugated fasteners are positioned one behind the other, to have adjacent fasteners placed in a mirror-image relationship to each other and to stick them together thus. In this arrangement there emerges a honeycomb-like pattern in which one prominence is set against another prominence. For the mirror-image arrangement it is necessary for every second corrugated fastener to be turned through 180° so that one prominence will always be abutting the opposite one.

In order to meet this drawback, a device has been projected which renders it possible to separate successive corrugated fasteners positioned with corrugations fitting one in the other, this being done with the assistance of a rammer which is provided with projections in the form of two fins the distance apart of which is approximately equal to two corrugations of the fasteners needing to be driven in. With the assistance of these projections, on each occasion one corrugated fasteners gets separated from the regular row of fasteners and is pressed down into the channel for driving home. It has been shown, however, that such a compressed-air fastener-driving device is inclined to have frequent breakdowns in operation since the sheet metal out of which the corrugated units are formed is extremely thin, and therefore during the driving process gets damaged by the two projections on the rammer.

In order entirely to obviate such interruptions to operation, it is a further known technique to arrange the individual corrugated joint fasteners at a distance from each other on spacing units. This leads to additional expenses, however, since the rammer has to take account of the spacing units and, apart from that, care has to be taken that the spacers will be discharged from the tool empty, a point which is, however, a nuisance.

A common disadvantage further attaches to all known row-type arrangements of corrugated fasteners: that the said regular rows are not flexible in the plane of the row and so made able to conform with irregularities in the slideway.

SUMMARY OF THE INVENTION

It is the object of the present invention to create a regular row of corrugated joint fasteners which does not necessitate any special design of rammer and of slideway for the rammer, and which furthermore does without spacers and is capable of conforming to irregularities in the slideway.

The problem posed is solved in the case of a regular row of corrugated fasteners of the type mentioned initially in that, according to the invention, adjacent corrugated fasteners have an unequal number of corrugations, so that only corrugation-type prominences located in the center of the fasteners touch each other and are stuck together.

On account of the unequal number of corrugations in the adjacent corrugated fasteners, the individual corrugated fasteners are stuck to each other with adhesive at only a few locations, and when the fastener-driving process is occurring the fasteners can be separated from the row by the rammer without any difficulty. When designing the rammer, there is no need to pay heed to the formation of the corrugated fasteners, and the rammer can therefore be selected to provide correspondingly optimal conditions for the requirements of the driving action. Since only the corrugated prominences in the center of the pertinent fasteners are connected to each other, the regular row of corrugated fasteners is flexible about its center line to a certain extent, and in particular the leading corrugated fastener is able to conform well to irregularities in the slideway.

According to an advantageous development of the invention, corrugated fasteners with five and with four corrugations are arranged in succession alternately. In the case of such a distribution of corrugations, on each occasion only two corrugated prominences will be in contact with each other in the middle of the fasteners. None of the remaining corrugations have any contact with each other.

It is an already known technique, in order to achieve more ready driving home of the corrugated joint fasteners, to sharpen the edge of the fastener which is the part first to be driven into the workpiece. The sharpening action takes place by means of an abrasive disc. It has been shown, however, that a sharp edge produced in this manner is frequently so soft that it bends during the driving stage and affects the driving home of the fastener disadvantageously. In order to counteract this drawback, according to a further development of the invention the corrugated fasteners are sharpened by a hobbing process applied on the edge to be driven first into a workpiece. The hobbing action takes place before the corrugating process on the sheet metal for the forming of the corrugated fasteners. For this reason the hobbed edge obtained extends over the entire length of the fasteners. Through the hobbing action, cold-work hardening of the cutting edge is obtained which makes the edge even more resistant. In this situation it should be borne in mind that the steel from which corrugated fasteners are made is a normal unhardened carbon steel.

BRIEF DESCRIPTION OF THE DRAWINGS

The invention will now be further described, by way of example, with reference to the accompanying drawings, in which:

FIG. 2 shows a second type of corrugated joint fastener for a regular row of corrugated fasteners according to the invention, the fastener having one corrugation less than the corrugated fastener shown in FIG. 1;

FIG. 7 shows a compressed-air fastener-driving device for fasteners with attached magazine for regular rows of corrugated fasteners according to the invention.

DESCRIPTION OF PREFERRED EMBODIMENTS

Figure 1:
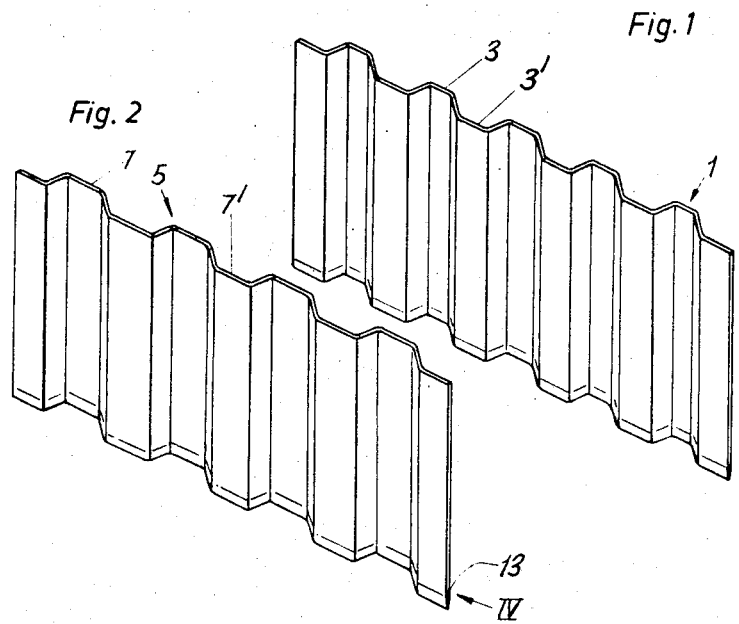
FIG. 1 shows a first type of corrugated joint fastener for a regular row of corrugated fasteners according to the invention.

Referring to the drawings, FIG. 1 shows a corrugated joint fastener 1 consisting of a thin sheet of steel of a corrugated formation. On the right-hand side, the corrugated fastener 1 has five corrugated prominences 3, while on its left-hand side it has four corrugated prominences 3'. The corrugated fastener 5 which is shown in FIG. 2 and which likewise consists of steel plate has one corrugation less along the same length of fastener. On the right-hand side in the drawing there are therefore four corrugated prominences 7, and on the left-hand side three corrugated prominences 7'.

Figure 3:
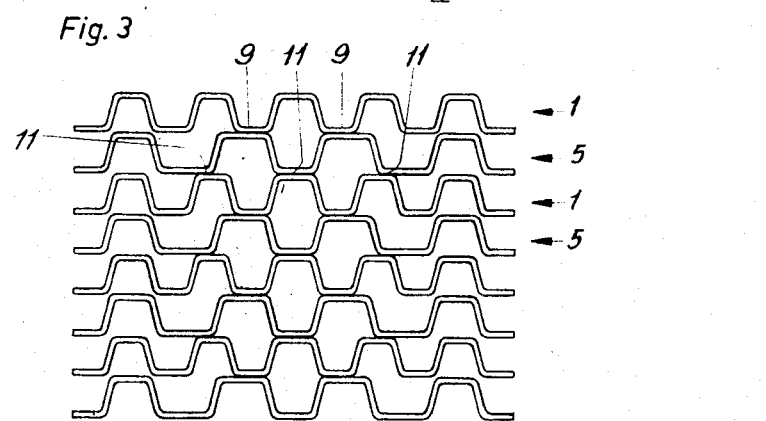
FIG. 3 shows a regular row of corrugated fasteners according to the invention consisting of fasteners illustrated in FIGS. 1 and 2.

In FIG. 3 the corrugated fasteners shown in FIGS. 1 and 2 are arranged in succession in a consistently alternating manner. Consequently corrugated fasteners 1 and 5 will always be located adjacently. The result of this arrangement is that, as shown in FIG. 3, the leading corrugated fastener 1 will touch the following corrugated fastener 5 at only two prominences. The locations of the contact are denoted by the number 9. One layer lower, adjoining a corrugated fastener 5 there is once more a corrugated fastener 1. In this situation three points of contact 11 result. According to whichever applies, in a constantly altering pattern two and three points of contact will occur alternately. All the corrugations situated outside of these have no contact with each other, so that a certain amount of flexibility in this regular row of corrugated fasteners according to FIG. 3 emerges in the plane of the drawing. In spite of the differing arrangement of corrugations, the corrugated fasteners do not overlap, and a rammer can therefore always be so formed that it strikes squarely on one corrugated row-associated unit 1 or 5. This has the further advantage that the corrugated fastener which is foremost on a given occasion and is ready for use in a process of insertion is able to find a position directly in the channel down which the driving operation occurs and does not have first of all to be inserted somehow into the said channel.

Figure 4:
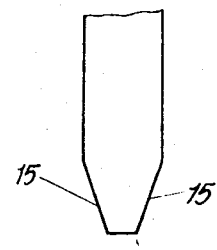
FIG. 4 shows a corrugated fastener with a sharpened edge.

FIG. 4 shows the front-end contour of one of the two corrugated fasteners, this being at the lower edge 13 (FIG. 2) which is the first part to be driven into a workpiece. By means of a hobbing process the lower edge of the corrugated fastener 1, 5 has been sharpened. The sharpened edge is brought out clearly in FIG. 4 through the double chamfer 15. As the sharpening process occurs by a cold-working procedure, the edges of the corrugated fasteners 1 and 5 are additionally cold-work hardened along the first entering edge 13 of the fastener concerned at the time.

Figure 5:
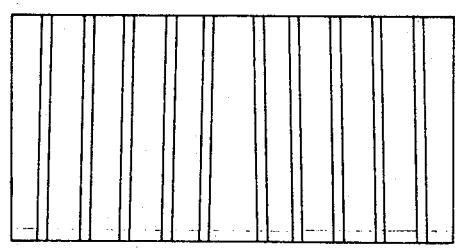
FIG. 5 is a side view of the corrugated fastener shown in FIG. 1.

The corrugated pattern of the fasteners does not run parallel to the direction of the insertion process. As is shown in FIG. 5, there are two separate parallel sets, these being to the right and left respectively of the center of the fastener. Both sets of corrugations diverge vis-a-vis the center line of the fastener and in the direction of the driving operation by an angle of about 1°30'. Through this feature the effect is achieved that a corrugated fastener not only combined the parts requiring to be connected together but also draws the parts together transversely to the direction of the main insertion.

Figure 6:
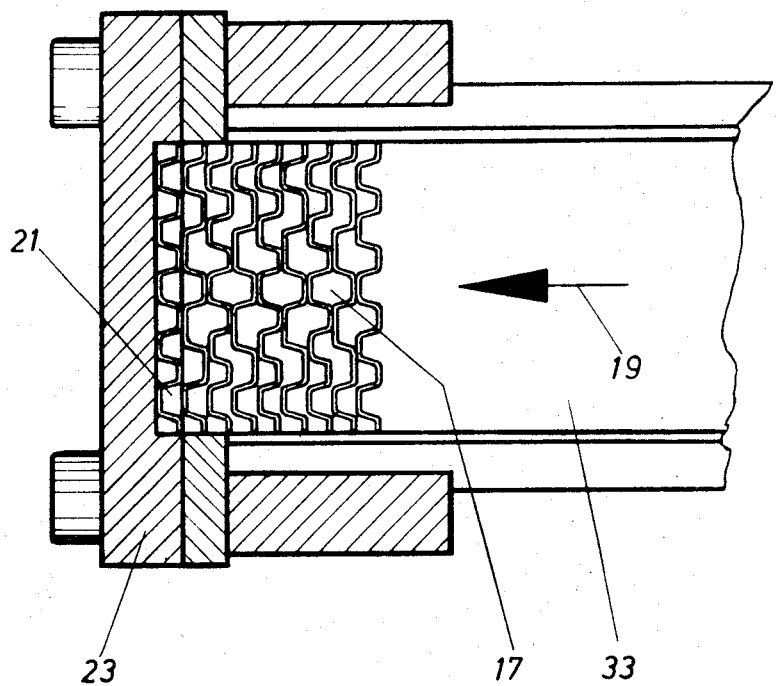
FIG. 6 is a plan view of a magazine for a regular row of corrugated fasteners according to the invention, the magazine being shown in section.

FIG. 6 comprises a section taken through a magazine for a regular row of corrugated fasteners according to the invention, the row arrangement 17 being pressed in the direction of arrow 19 into a channel 21 down which the fasteners are driven. The tool carrying the driving rammer consists of a U-shaped part 23. FIG. 6 in addition clearly shows that only one corrugated fastener can be located at a time in the driving channel 21, and the driving rammer can therefore always hit only one fastener. Through this circumstance, deformations and consequential interruptions in operation are to a large extent obviated.

The overall arrangement of a compressed-air fastener-driving device 29 to drive in corrugated fasteners brought forward in a magazine is illustrated in FIG. 7. For this purpose, the magazine 31 shown in FIG. 6 is attached to a compressed-air fastener-driving device 29. In the magazine 31 there is a feed duct 33 in which a pusher 35 is capable of being pressed against the row-type arrangement 17 of corrugated fasteners in the direction of the arrow 19 by means of a tension spring 37. The front corrugated fastener thus arrives directly in the channel for effecting insertion, in which the rammer 27 travels downward to execute a driving stroke.

The remaining structure of the compressed-air fastener-driving device may be of an already known type and therefore does not require to be described in greater detail in the present context.

I claim:

1. A regular row of corrugated joint fasteners, said corrugated fasteners consisting of two types of equal length, one type having a plurality of prominences formed by said corrugation and the other type having at least one less prominence than said one type, and the two types of fastener being located alternately in said row and being so arranged that only the prominences at and/or adjacent to the center of the fasteners are in contact with each other, said contacting prominences being stuck together.

2. A regular row of corrugated joints fasteners as claimed in claim 1, in which said one type of fastener comprises five prominences and said other type of fastener comprises four prominences.

3. A regular row of corrugated joint fasteners as claimed in claim 1, in which said corrugated fasteners are sharpened by a hobbing process applied on the edge to be driven first into a workpiece.

4. A regular row of corrugated joint fasteners as claimed in claim 1, in which the sets of corrugations on each corrugated joint fastener diverge on either side of the center line of said fastener in the direction in which it is to be driven into a workpiece.

5. A regular row of corrugated joint fasteners as claimed in claim 4, in which said corrugations are inclined at an angle of about 1°30' to lines drawn parallel to the center line of the fastener and to the direction in which said fastener is to be driven into a workpiece.

* * * * *